United States Patent [19]

Ozaki et al.

[11] Patent Number: 5,091,488

[45] Date of Patent: Feb. 25, 1992

[54] POLYETHYLACETYLENE DERIVATIVE AND PROCESS FOR PREPARATION THEREOF

[75] Inventors: Masaru Ozaki; Yukihiro Ikeda, both of Fuji; Tatsumi Arakawa, Yokohama, all of Japan

[73] Assignee: Director-General of Agency of Industrial Science and Technology, Tokyo, Japan

[21] Appl. No.: 443,028

[22] Filed: Dec. 1, 1989

Related U.S. Application Data

[63] Continuation of Ser. No. 170,090, Mar. 9, 1988, abandoned, which is a continuation of Ser. No. 784,322, Oct. 4, 1985, abandoned.

[30] Foreign Application Priority Data

Nov. 30, 1984 [JP] Japan ................ 59-251519
Jan. 18, 1985 [JP] Japan ................ 60-5836
Aug. 15, 1985 [JP] Japan ................ 60-178626

[51] Int. Cl.⁵ .............. C08F 30/08; C08F 38/00; C08F 4/06
[52] U.S. Cl. ............. 526/90; 526/113; 526/114; 526/159; 526/279; 526/285; 526/259; 526/326.5
[58] Field of Search ........... 526/285, 95, 98, 90, 526/121, 142, 159, 170, 171, 131, 134, 279, 285, 114, 113; 525/359.1, 326.5, 35

[56] References Cited

U.S. PATENT DOCUMENTS

| 2,671,795 | 3/1954 | Trisch et al. ............ 526/279 |
| 3,051,693 | 8/1962 | Leto ..................... 526/285 |
| 3,083,125 | 3/1963 | Bohlmann et al. ......... 526/285 |
| 3,700,648 | 10/1972 | Hirooko et al. ......... 526/169 |
| 4,277,588 | 7/1981 | Marmann et al. ......... 526/114 |
| 4,490,512 | 12/1984 | Katz .................... 526/90 |
| 4,550,216 | 10/1985 | Basset et al. ........... 526/169 |
| 4,567,245 | 1/1986 | Takamizawa et al. ...... 526/279 |
| 4,579,921 | 4/1986 | Gouarderes et al. ...... 526/159 |
| 4,711,532 | 12/3989 | Choe .................... 526/285 |

FOREIGN PATENT DOCUMENTS

| 0012798 | 5/1980 | European Pat. Off. ..... 526/279 |
| 58-206611 | 12/1983 | Japan ................... 526/279 |
| 854388 | 11/1960 | United Kingdom ......... 526/90 |
| 2205845 | 12/1988 | United Kingdom ......... 526/285 |

OTHER PUBLICATIONS

J.C.S. Chem. Comm. 1979, Holmes et al., pp. 840–842.
G. Wegner, Die Makvomol, Chem. 154, p. 35 (1972).
R. H. Baughman, J. Appl. Phys., 43(11), p. 4362 (1972).
A. J. Melveger et al., J. Polym. Sci., Polym. Phys. Ed., 11, p. 603 (1973).
G. F. Exarhos et al., J. Am. Chem. Soc., 98 (2), p. 481 (1976).

Primary Examiner—Thurman K. Page
Assistant Examiner—Peter F. Kulkosky
Attorney, Agent, or Firm—Cushman, Darby & Cushman

[57] ABSTRACT

A novel polyethynylacetylene derivative represented by the formula

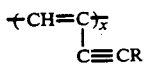

wherein R is H, (C1-7) alkyl, phenyl, benzyl, naphthyl, carbazole, (C2-7) vinyl-alkyl —$CX_1X_2(OH)$ or —$SiX_1X_2X_3$ in which $X_1$, $X_2$ and $X_3$ are H, (C1-7) alkyl, phenyl or benzyl, with the proviso that the case where all of $X_1$, $X_2$ and $X_3$ are H is excluded and x is a number of 20 to 500. The polyethynylacetylene derivative is prepared by polymerizing a monomer of the formula HC≡C—C≡CR wherein R is as defined above, with the proviso that the case where R is H is excluded, in the presence of a metathesis catalyst or a Ziegler catalyst. A polyethynylacetylene derivative of the above formula (wherein R=H) is prepared by reacting a polyethynylacetylene derivative of the above formula wherein R=$Si(C_nH_{2n+1})_3$ with a desilylating agent. The polyethynylacetylene derivative is soluble in organic solvents and can be shaped into various articles. This polymer is used as a high-sensitivity pattern-forming material and is promising as a precursor for polyacene polymers.

6 Claims, 3 Drawing Sheets

POLYETHYLACETYLENE DERIVATIVE AND PROCESS FOR PREPARATION THEREOF

This is a continuation of application Ser. No. 07/170,090, filed Mar. 9, 1988 abandoned which is an FWC of Ser. No. 06/784,322 filed Oct. 4, 1985 abandoned which was abandoned upon the filing hereof.

BACKGROUND OF THE INVENTION (1) Field of the Invention

The present invention relates to a novel polyethynylacetylene derivative and processes for the preparation thereof.

(2) Description of the Related Art

Poly-substituted acetylenes have attracted much attention as organic solvent-soluble polyacetylene derivatives represented by polymethylacetylene and polyphenylacetylene. Thus, although research work has been extensively carried out on these derivatives, they have not been found satisfactory as electrically conductive polymers. Namely, even if doping is carried out, the electrical conductivity is very low and within a semiconductor range. Accordingly, a poly-substituted acetylene having a triple bond functional group in the side chain has attracted attention as a precursor polymer for the synthesis of a polyacene polymer. From various calculations of molecular orbitals, it has been considered that polyacene polymers will show a metallic electrical conductivity, and synthesis of polymers of this type has been expected. Moreover, in view of the molecular structure, it is expected that precursor polymers for these polyacene polymers will be effective as materials for forming patterns with a high sensitivity by energy irradiation with light, electrons or ions. However, such precursor polymers have not been synthesized, and a process for preparing these precursor polymers has not been reported.

SUMMARY OF THE INVENTION

It is a primary object of the present invention to provide a novel polyethynylacetylene derivative. This polymer is soluble in organic solvents and can be shaped into various articles as a solution. This polymer can be used as a high-sensitivity pattern-forming material and is very promising as a precursor polymer for a polyacene polymer.

The novel polyethynylacetylene derivative of the present invention is represented by the following general formula:

wherein R is a hydrogen atom, an alkyl group having 1 to 7 carbon atoms, a phenyl group, a benzyl group, a naphthyl group, a carbazole group, a vinyl-alkyl group having 2 to 7 carbon atoms or a group $-CX_1X_2(OH)$ or $-SiX_1X_2X_3$ in which $X_1$, $X_2$ and $X_3$ independently represents a hydrogen atom, an alkyl group having 1 to 7 carbon atoms, a phenyl group or a benzyl group, with the proviso that the case where all of $X_1$, $X_2$ and $X_3$ are a hydrogen atom is excluded, and x is a number of from 20 to 500.

The polyethynylacetylene derivative of the present invention is prepared by a process wherein a monomer represented by the following general formula:

wherein R is as defined above, with the proviso that the case wherein R is a hydrogen atom is excluded, is polymerized in the presence of a metathesis catalyst or a Ziegler catalyst.

DESCRIPTION OF THE PREFERRED EMBODIMENTS

In the general formula representing the polyethynylacetylene derivative of the present invention, x is the number of monomer units expressed in terms of the units of polystyrene, which is calculated by dividing the number average molecular weight as polystyrene determined by GPC (gel permeation chromatography) by the molecular weight of styrene, that is, 104. If x is in the range of $500 \geq x \geq 20$, the polymer can be shaped by a solvent casting method, an injection molding method and the like and shows a high sensitivity as the pattern-forming material. If x is smaller than 20, the compound is an oligomer and has a poor shapeability. The oligomer does not have as satisfactory a sensitivity as the pattern-forming material. Moreover, if x is smaller than 20, since the conjugated chain length is short, the compound is not suitable as a precursor polymer for obtaining a highly electrically conductive polyacene polymer.

In the IR absorption spectrum of the polyethynylacetylene derivative of the present invention, there are observed absorption bands at 3000–3100 cm$^{-1}$, about 1600 cm$^{-1}$ and 2000 to 2250 cm$^{-1}$, which are attributed to olefinic C—H stretching vibrations, C═C stretching vibrations and C≡C stretching vibrations, respectively. Furthermore, in the $^1$H-NMR spectrum, a peak is observed at a position of a chemical shift value δ of 5.0 to 7.5 ppm based on TMS, which is attributed to olefinic H. In the $^{13}$C-NMR spectrum, there are observed peaks at positions of chemical shift values δ of 100 to 150 ppm and 70 to 110 ppm based on TMS, which are attributed to olefinic C and acethylenic C, respectively. Moreover, in the IR, $^1$H-NMR and $^{13}$C-NMR spectra, peaks attributed to the molecular structure of the organic group R are observed. From these results of the spectral analysis and the results of the elementary analysis, it is confirmed that the polyethynylacetylene derivative of the present invention has a purity of at least 95%. The number x of monomer units as polystyrene calculated from the results of GPC is in the range of $20 \leq x \leq 500$, and the polymer has a yellow to blackish brown color. The polymer is soluble in organic solvents such as toluene, chloroform, acetone, ether and dimethylsulfoxide, but is insoluble in methanol.

The polyethynylacetylene derivative of the present invention can be obtained by polymerizing a monosubstituted 1,3-butadiyne monomer HC≡C—C≡CR (R is not H) in the presence of an acetylene-polymerizing catalyst. Polyethynylacetylene in which R is a hydrogen atom can be obtained by reacting the polymer obtained by the above polymerization with an agent for removing the organic group R to introduce a hydrogen atom.

As the monosubstituted 1,3-butadiyne monomer used in the preparation process of the present invention, there can be mentioned, for example, 1-methyl-1,3-butadiyne, 1-ethyl-1,3-butadiyne, 1-propyl-1,3-butadiyne, 1-isopropyl-1,3-butadiyne, 1-butyl-1,3-butadiyne, 1-isobutyl-1,3-butadiyne, 1-t-butyl-1,3-butadiyne, 1-pentyl-1,3-butadiyne, 1-hexyl-1,3-butadiyne, 1-heptyl-1,3-butadiyne, 1-phenyl-1,3-butadiyne, 1-benzyl-1,3-butadiyne, 1-α-naphthyl-1,3-butadiyne, 1-β-naphthyl-1,3-butadiyne, 1-N-carbazole-1,3-butadiyne, 1-vinyl-1,3-butadiyne, 1-methylvinyl-1,3-butadiyne, 1-ethylvinyl-1,3-butadiyne, 1-propylvinyl-1,3-butadiyne, 1-butylvinyl-1,3-butadiyne, 1-pentylvinyl-1,3-butadiyne, 1-ethylcarbinol-1,3-butadiyne, 1-dimethylcarbinol-1,3-butadiyne, 1-methylphenylcarbinol-1,3-butadiyne, 1-diphenylcarbinol-1,3-butadiyne, 1-methylbenzylcarbinol-1,3-butadiyne, 1-trimethylsilyl-1,3-butadiyne, 1-triethylsilyl-1,3-butadiyne, 1-methyldiethylsilyl-1,3-butadiyne, 1-tributylsilyl-1,3-butadiyne, 1-triheptylsilyl-1,3-butadiyne, 1-triphenylsilyl-1,3-butadiyne, 7 35 1-tribenzylsilyl-1,3-butadiyne and 1-diethylsilyl-1,3-butadiyne.

It is preferred that the concentration of the monosubstituted 1,3-butadiyne monomer used be 0.01 to 10M, especially 0.1 to 5M. If the monomer concentration is within the above-mentioned range, the polyethynylacetylene having a high molecular weight can be obtained in a high yield.

Any of known acetylene polymerizing catalysts such as metathesis catalysts, Ziegler catalysts and Luttinger catalysts may be used in the process of the present invention. In order to obtain a polyethynylacetylene derivative having a high polymerization degree, it is preferred that a metathesis catalyst be used. Furthermore, in order to obtain the polymer of the present invention in a high yield, it is preferred that a Ziegler catalyst be used.

As the metathesis catalyst, there may be used a catalyst system comprising a compound of a transition metal selected from the groups IVa through VIII of the Periodic Table as the main catalyst ingredient, and a compound of a transition metal of the group Va or VIa of the Periodic Table is especially preferred as the main catalyst ingredient. If an oxidizing agent or reducing agent is combined as an assistant with the above-mentioned main catalyst ingredient, a metathesis catalyst having an enhanced activity can be obtained. If a catalyst as described above is used, the polyethynylacetylene derivative can be obtained at a high polymerization degree. As the compound of the transition metal selected from the groups IVa through VIII of the Periodic Table, there can be mentioned halides, oxides, carbonyl compounds and metal-carbon compound (carben) of Ti, Zr, V, Nb, Ta, Mo, W, Re, Ru, Os, Rh and Ir. $WX_6$ and $MoX_5$ (X is a halogen atom) are preferred because they show an especially high catalytic activity.

As specific examples of the main catalyst ingredient, there can be mentioned titanium tetrachloride, zirconium tetrachloride, vanadium tetrachloride, niobium pentafluoride, niobium pentachloride, niobium pentabromide, niobium pentaiodide, tantalum pentachloride, tantalum pentabromide, molybdenum pentachloride, molybdenum pentabromide, tungsten hexachloride, tungsten hexabromide, rhenium pentachloride, ruthenium trichloride, osmium trichloride, rhodium trichloride, rhodium triiodide, iridium trichloride, titanium oxide, zirconium oxide, vanadium tetraoxide, niobium oxide, tantalum oxide, molybdenum trioxide, tungsten trioxide, rhenium trioxide, osmium tetraoxide, rhodium trioxide, tungsten carbonyl, molybdenum carbonyl, rhenium carbonyl, rhodium carbonyl, osmium carbonyl, (diphenylcarben)pentacarbonyl tungsten and (phenylmethoxycarben)pentacarbonyl tungsten. As specific examples of the assistant, there can be mentioned methanol, ethanol, sodium peroxide, tetramethyltin, tetraethyltin, tetrabutyltin, tetraphenyltin, triphenylbismuth, triphenylantimony, diethylaluminum chloride and triethylaluminum.

Metathesis catalysts that can be used in the preparation process of the present invention are not limited to those exemplified above. Namely, various known metathesis catalysts for the polymerization of cyclo-olefine and the polymerization of substituted acetylenes can be used in the process of the present invention. In case of a carbonyl compound as described above, the catalyst activity can be increased by irradiation with ultraviolet rays in a carbon tetrachloride solvent. In the case where a catalyst system comprising the main catalyst ingredient and an assistant is used, before addition to the monomer-containing polymerization liquid, both the main catalyst ingredient and assistant may be dissolved in an organic solvent and aged to increase the catalyst activity. It is preferred that the concentrations of the main catalyst and assistant used be within a range of from 1 to 100 mM, especially from 5 to 50 mM. In case of a catalyst system comprising the main catalyst ingredient and an assistant, the main catalyst/assistant concentration ratio is preferably from 1.0/0.1 to 1.0/10 because the catalyst activity is increased. If the catalyst concentration is within the above-mentioned range, polyethynylacetylene derivatives having a high molecular weight can be obtained in a high yield.

As the Ziegler catalyst used in the preparation process of the present invention, there can be mentioned systems effective for polymerization of acetylene, comprising a compound of a transition metal selected from the groups IV through VIII of the Periodic Table and an organometallic compound of a metal selected from the groups I through IV of the Periodic Table. Systems comprising compounds of transition metals such as titanium, vanadium, iron, chromium and cobalt and organometallic compounds of magnesium, zinc, aluminum, boron and tin are preferred because they provide especially high polymer yields. A combination catalyst system comprising $Ti(OR')_4$ and $AlR''_3$ (in which R' and R'' independently represent an alkyl group having 1 to 7 carbon atoms) is especially preferred.

As typical examples of the transition metal compound, there can be mentioned tetramethoxytitanium, tetra-n-butoxytitanium, tetraisopropoxytitanium, tetraphenoxytitanium, trisacetylacetonatotitanium, titanium oxyacetylacetonate, titanium trichloride, titanium tetrachloride, tetracyclopentadienyldititanium, vanadium trisacetylacetonate, vanadium oxyacetylacetonate, iron trisacetylacetonate, ferric chloride, chromium trisacetylacetonate, cobalt trisacetylacetonate and cobalt nitrate.

As typical examples of the organometallic compound, there can be mentioned diethylmagnesium, methylmagnesium iodide, phenylmagnesium bromide, diphenylmagnesium, ethylethoxymagnesium, dimethylzinc, diethylzinc, diethoxyzinc, trimethylaluminum, triethylaluminum, triisobutylaluminum, diethylaluminum chloride, diethylaluminum butoxide, trisdimethylaminoaluminum, diethylaluminum dimethylamide, trimethyldiethylsiloxalene, tetraethyldialumoxane, trimethylboron, dibutylboron chloride, sodium boron tetrahydride, diborane, tetramethyltin, dimethyltin dichloride and trimethyltin hydride. In carrying out the preparation process of the present invention, these transition metal compounds may be used alone or in combination, and these organic metal compounds also may be used alone or in combination.

The mixing ratio of the organometallic compound to the transition metal compound is not particularly critical, but it is generally preferred that the molar ratio of the metal of the organometallic compound to the transition metal of the transition metal compound be from 1 to 100. In the preparation process of the present invention, the catalyst concentration is not particularly critical. However, it is preferred that the catalyst concentration as calculated as the molar concentration of the transition metal of the transition metal compound be 0.0001 to 1M, especially 0.005 to 0.5M.

In some combination catalysts comprising a transition metal compound as described above and an organometallic compound as described above, the catalyst activity is increased if both the compounds are mixed in advance and the mixture is aged by standing for more than 30 minutes. In this case, it is preferred that a catalyst solution be prepared in advance and after aging of the catalyst, the monomer be polymerized.

In the preparation process of the present invention using the above-mentioned metathesis or Ziegler polymerization catalyst, the polymerization method and the polymerization conditions are not particularly critical. For example, there may be adopted a polymerization method in which the monosubstituted 1,3-butadiyne monomer and the metathesis or Ziegler polymerization catalyst are dissolved in an organic solvent as a polymerization solvent, polymerization is carried out in vacuo or in an inert gas atmosphere, and the formed polymer solution is dropped into a poor solvent such as methanol to precipitate the intended polymer. In this method, any of organic solvents dissolving the monomer and polymerization catalyst homogeneously and not deactivating the active points of the polymerization catalyst can be used. For example, benzene, toluene, hexane, heptane, decane, cyclohexane, diethyl ether, tetrahydrofuran and dioxane are used. These solvents may be used alone or in combination. Polymerization may be conducted with stirring, or a stationary polymerization method may be adopted. If the catalyst is insoluble in any polymerization solvent, polymerization of the monomer can be promoted by violently stirring the polymerization reaction mixture.

The polymerization temperature in the above-mentioned polymerization method is not particularly critical, but it is ordinarily preferred that the polymerization temperature be $-100°$ C. to $200°$ C. From the viewpoint of handling ease, it is especially preferred that the polymerization temperature be $-80°$ C. to $150°$ C. The polymerization time depends upon the time when the monomer is completely consumed and the polymerization is thus stopped.

The polyethynylacetylene derivative of the present invention in which R is a hydrogen atom can be obtained by reacting a polyethynylacetylene derivative (R is not H) obtained according to the above-mentioned polymerization method with an agent for removing the organic group R to remove the organic group from the polymer and adding a proton donor such as water, methanol or ethanol. In order to obtain the polyethynylacetylene derivative in which R is a hydrogen atom, among various polymers (R is not H), a polyethynylacetylene derivative in which R is $Si(C_nH_{2n+1})_3$ (where n is an integer of from 1 to 7) is especially preferred because desilylation can be easily accomplished. As the desilylating agent used for the desilylation reaction, there can be mentioned R''' NF, KF and R''''Li (in which R''' and R'''' are an alkyl group having 1 to 5 carbon atoms or a phenyl group). It is preferred that KF be used in combination with a crown ether compound. Among these desilylating agent, R''' NF (in which R''' is an alkyl group having 1 to 5 carbon atoms) and KF-18-crown-6 are preferred because the desilylating activity is especially high. It is preferred that the desilylating agent be used in an amount of 0.001 to 1000 moles per mole of the units of the polymer and the desilylation reaction be conducted with stirring at $0°$ C. to $100°$ C. for 1 to 72 hours. After completion of the above desilylation reaction, a proton donor as described above is added to the reaction mixture liquid to form a polyethynylacetylene derivative of the present invention in which R is a hydrogen atom.

The molecular weight of the polyethynylacetylene derivative obtained by the above-polymerization method under the above-mentioned polymerization conditions, optionally through the above-mentioned organic group-removing reaction, is from 20 to 500 as the number of monomer units calculated as polystyrene.

The molecular weight of the polyethynylacetylene derivative obtained by the polymerization using a metathesis polymerization catalyst is more than about 2 times the molecular weight of the polyethynylacetylene derivative obtained by the polymerization using a Ziegler catalyst. On the other hand, the polymer yield attained by a Ziegler catalyst is more than about 2 times the polymer yield attained by a metathesis catalyst.

The polyethynylacetylene derivative obtained by the preparation process of the present invention is in the form of a powder having a yellow to blackish brown color. This polymer is soluble in organic solvents such as toluene, chloroform, acetone and ether and the polymer can be shaped by a solvent casting method, an injection molding method or the like.

The polyethynylacetylene derivative of the present invention can be used as a high-sensitivity pattern-forming material and is very promising as a precursor polymer for a polyacene polymer. Accordingly, future development of this polyethynylacetylene derivative in the field of highly electrically conductive organic materials is expected and the polyethynylacetylene derivative is very valuable as an electronic or electrical material.

The present invention will now be described in detail with reference to the following examples.

EXAMPLE 1

In a 100 ml toluene solution (1M concentration) of a monomer $HC{\equiv}C-C{\equiv}C-Si(CH_3)_3$ was gradually dropped 1 ml of a toluene solution containing tungsten hexachloride (2 mmol) and tetraphenyltin (2 mmol), and polymerization was carried out at about $40°$ C. for 24 hours. After the passage of 24 hours, a small amount of methanol was dropped into the reaction mixture to stop the polymerization. The polymer solution was filtered to remove the catalyst residue. All of the foregoing monomer-synthesis, polymerization and post treatment operations were carried out in vacuo or in an inert gas atmosphere so as to avoid the incorporation of O₂ and H₂O during these operations. Then, the polymer-containing filtrate was slowly dropped into 2 l of methanol and this precipitation treatment was repeated to obtain a blackish brown powder.

Figure 1:
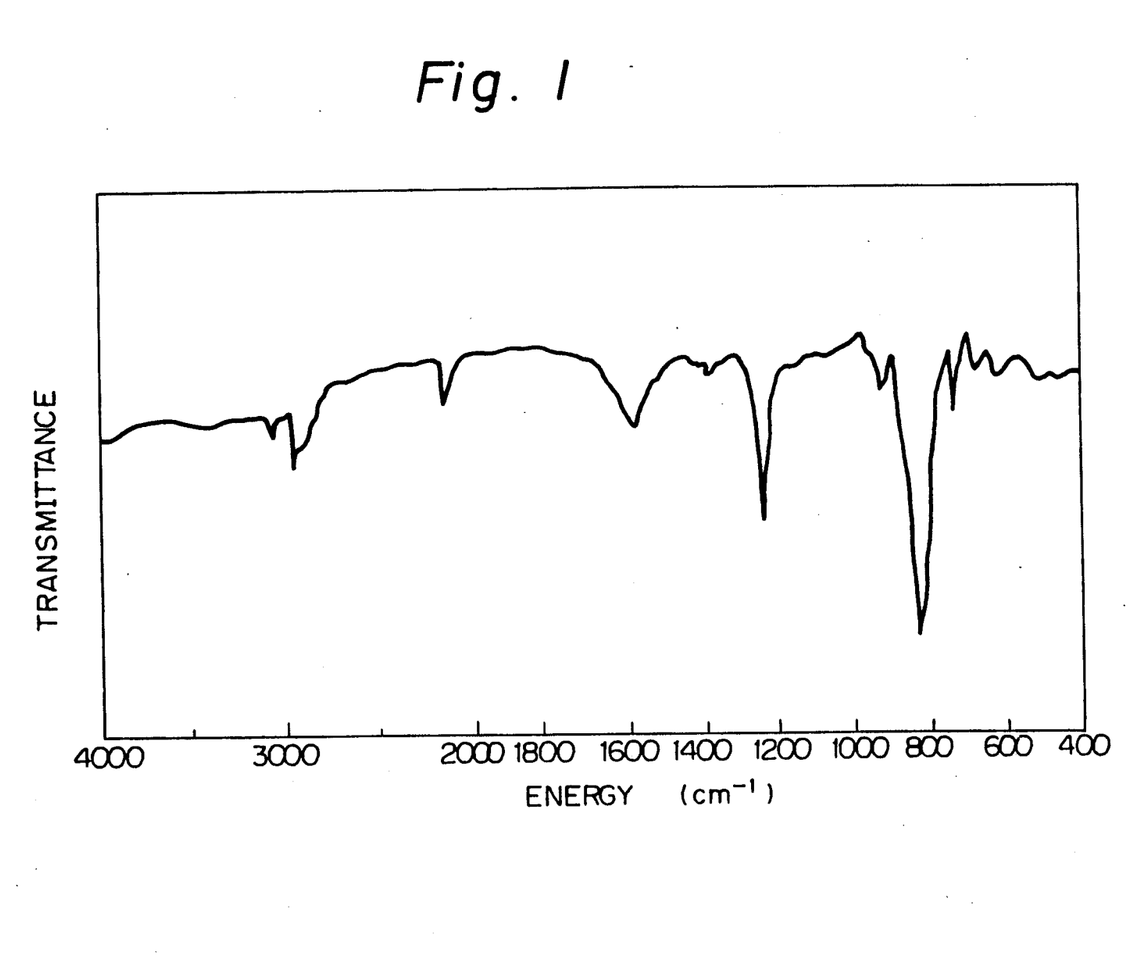
FIG. 1 shows the IR spectrum of polytrimethylsilylethynylacetylene obtained by the KBr powder method.
Figure 2:
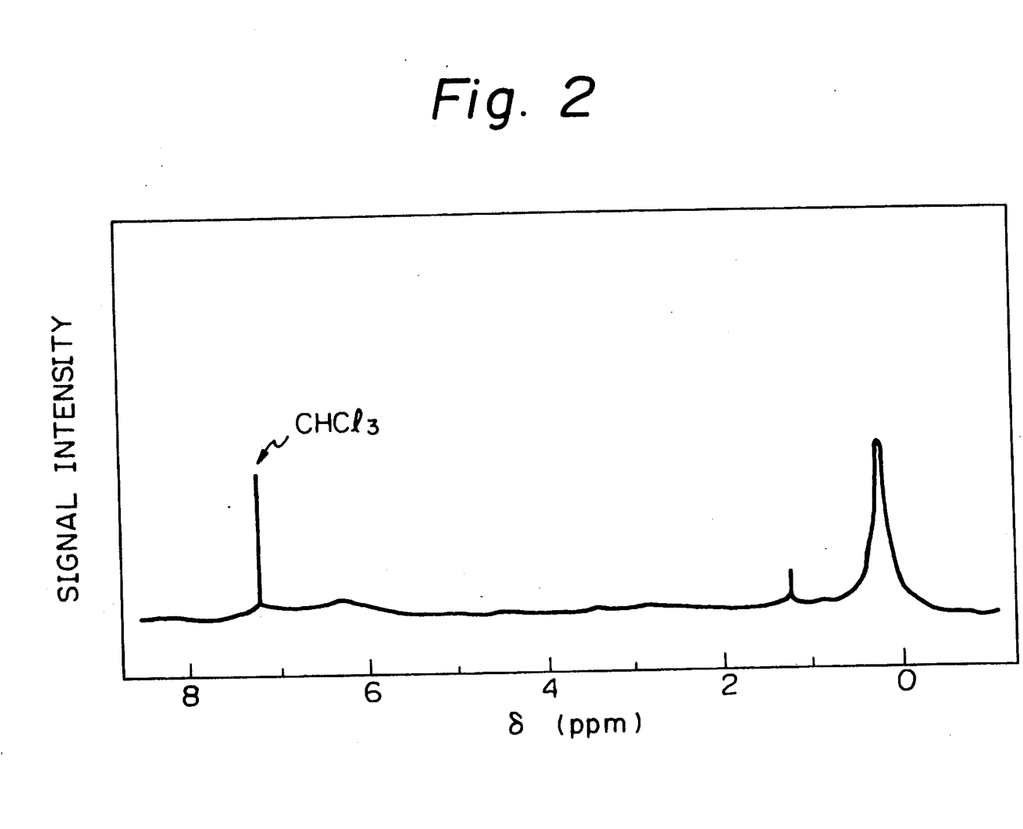
FIG. 2 shows the $^1$H-NMR (200 MHz) spectrum of polytrimethylsilylethynylacetylene in deutero chloroform as the solvent.
Figure 3:
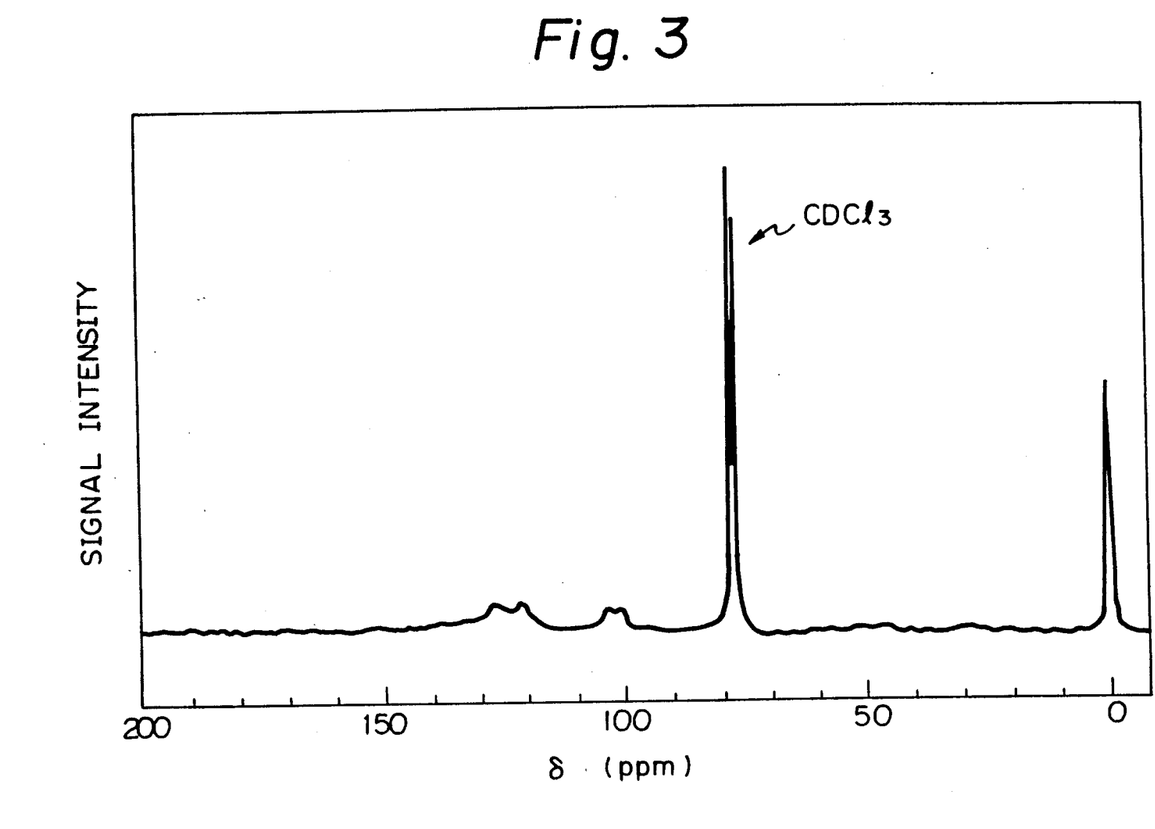
FIG. 3 shows the $^{13}$C-NMR spectrum (50 MHz) of polytrimethylsilylethynylacetylene in deutero chloroform as the solvent.

The structure of this powder was examined by the IR spectrum analysis, ¹H-NMR spectrum analysis, ¹³C-NMR spectrum analysis, GPC and elementary analysis. The IR spectrum obtained by the KBr powder method is shown in FIG. 1. As is seen from FIG. 1, IR peaks were observed at 3070 cm⁻¹, 2960 cm⁻¹, 2150 cm⁻¹, 1600 cm⁻¹, 1400 and 1250 cm⁻¹, and 845 cm⁻¹, attributed to olefinic C—H stretching vibrations, stretching vibrations of C—H of the CH₃ group, C≡C stretching vibrations, C=C stretching vibrations, stretching vibrations of the methyl group of Si—CH₃, and Si—C stretching vibrations, respectively. The ¹H-NMR spectrum of the powder is shown in FIG. 2. Since the blackish brown powder was soluble in chloroform, deutero chloroform was used as the NMR solvent. In this NMR spectrum, peaks attributed to the olefinic hydrogen atom and the hydrogen atom of —Si(CH₃)₃ were observed at δ=6.3 ppm and δ=0.2 ppm, respectively. Their integration intensity ratio was 1:9. The ¹³C-NMR spectrum of the powder is shown in FIG. 3. In this NMR spectrum, peaks attributed to the olefinic carbon atom, the acetylenic carbon atom and the carbon atom of the Si(CH₃)₃ group were observed at δ=120 to 130 ppm, δ=100 to 105 ppm and δ=0 ppm, respectively. From the results of GPC conducted at normal temperature by using chloroform as the solvent, it was seen that the number average molecular weight as calculated as polystyrene was about 9000. Furthermore, from the results of the elementary analysis, it was found that the C/H/Si ratio was 7.1/9.8/1.0. From the foregoing measurement results, it was confirmed that polytrimethylsilylethynylacetylene of the formula

(where x is about 86) was obtained.

A film of this polymer was formed on a glass substrate by a solvent casting method using acetone as the solvent. When the film was exposed to rays of a 100-W low-pressure mercury lamp for only 2 seconds, the exposed portion was completely insolubilized. Thus, it was confirmed that a pattern could be formed.

EXAMPLE 2

By using 1-methyl-1,3-butadiyne monomer, a brown powder was obtained by the same polymerization method as described in Example 1, and the structure of this brown powder was examined.

In the IR spectrum, peaks attributed to the stretching vibrations of olefinic C—H, C—H of the CH₃ group, C≡C and C=C were observed at 3060 cm⁻¹, 2960 cm⁻¹, 2230 cm⁻¹ and 1600 cm⁻¹, respectively. In the ¹H-NMR spectrum, peaks attributed to the olefinic hydrogen atom and the hydrogen atom of the CH₃ group were observed at δ=6.2 ppm and δ=1.9 ppm, respectively, and the integration intensity ratio was ⅓. In the ¹³C-NMR spectrum, peaks attributed to the olefinic carbon atom, the acetylenic carbon atom and the carbon atom of the methyl group were observed at δ=130 ppm, δ=110 ppm and δ=29 ppm, respectively. From the results of GPC, it was found that the number average molecular weight as calculated as polystyrene was about 15,000. From the results of the elementary analysis, it was found that the C/H ratio was 5.1/4.0. From the foregoing measurement results, it was confirmed that the blackish brown powder was high-purity polymethylethynylacetylene of the formula

(where x is about 144).

In the same manner as described in Example 1, a film of the polymer was formed on a glass substrate and exposed to rays from a 100-W low-pressure mercury lamp for 2 seconds. The exposed portion was completely insolubilized. It was confirmed that a pattern could be formed.

EXAMPLE 3

By using 1-phenyl-1,3-butadiyne monomer, a blackish brown polymer was obtained by the same polymerization method as described in Example 1. The yield was 40% based on the charged monomer.

The structure of the obtained powder was examined. In the IR spectrum, peaks attributed to the stretching vibrations of olefinic C—H, C≡C and C=C were observed at 3060 cm⁻¹, 2200 cm⁻¹ and 1600 cm⁻¹, respectively, and strong peaks attributed to out-of-plane C—H deformation vibrations peculiar to the benzene ring were observed at 700 and 760 cm⁻¹. In the ¹H-NMR spectrum, peaks attributed to the olefinic hydrogen atom and the hydrogen atom of the benzene ring were observed as broad signals at δ=6 to 7 ppm and δ=7 to 8 ppm, respectively. In the ¹³C-NMR spectrum, peaks attributed to the olefinic carbon atom, the acetylenic carbon atom and the carbon atom of the benzene ring were observed at δ=135 to 145 ppm, δ=85 to 95 ppm and δ=120 to 135 ppm, respectively, and the integration intensity ratio was 1/1/3. From the results of GPC, it was found that the number average molecular weight was about 13,000 as calculated as polystyrene. From the results of the elementary analysis, it was found that the C/H ratio was 10.2/6.0. From the foregoing measurement results, it was found that high-purity polyphenylethynylacetylene of the formula (where x is about 126) was obtained.

In the same manner as described in Example 1, a film of the polymer was formed on a glass substrate by using toluene as the solvent and exposed to rays from a 100-W low-pressure mercury lamp for 1 second. The exposed portion was completely insolubilized. It was confirmed that a pattern could be formed.

EXAMPLE 4

A tetrahydrofuran solution containing (C₄H₉)₄NF was added to a tetrahydrofuran solution of the polytrimethylsilylethynylacetylene obtained by the polymerization method of Example 1 so that the amount of (C₄H₉)₄NF was 25 equivalents to the trimethylsilyl group of the polymer. The mixture was stirred at 25° C. for 20 hours to effect desilylation reaction. A small amount of water was added to the reaction mixture liquid and the mixture was sufficiently shaken to extract an ether layer. This operation was repeated. The extracted ether layer was concentrated to obtain a blackish brown powder.

The structure of the powder was examined in the same manner as described in Example 1. In the IR spectrum, peaks attributed to the stretching vibrations of acetylenic C—H, olefinic C—H, C≡C and C=C were observed at 3300 cm$^{-1}$, 3070 cm$^{-1}$, 2100 cm$^{-1}$ and 1600 cm$^{-1}$, respectively. In the $^1$H-NMR spectrum, peaks attributed to the olefinic hydrogen atom and the acetylenic hydrogen atom were observed at δ=6.0 ppm and δ=2.1 ppm and the integration intensity ratio was 1:1. From the results of GPC, it was found that the molecular weight of the powder was about 7,000 as calculated as polystyrene. From the results of the elementary analysis, it was found that the C/H ratio was 2.1/1.0. From the foregoing measurement results, it was found that the blackish brown-powder was polyethynylacetylene of the formula

(where x is about 67).

In the same manner as described in Example 1, a film of the polymer was formed on a glass substrate and exposed to rays of a 100-W low-pressure mercury lamp for 1 second. The exposed portion was completely insolubilized. It was confirmed that a pattern could be formed.

EXAMPLE 5

To 100 ml of a toluene solution containing 1-phenyl-1,3-butadiyne monomer at a concentration of 1M was added 10 ml of a preliminarily prepared catalyst solution containing tetra-n-butoxytitanium (2 mmol) and triethylaluminum (8 mmol), and polymerization was carried out at 30° C. for 48 hours with stirring. The catalyst toluene solution was allowed to stand and aged at room temperature for 30 minutes before it was used. The preparation of the catalyst and the polymerization were conducted in an argon atmosphere. After completion of the polymerization, the polymer solution was slowly dropped into 2 l of methanol. This precipitation operation was repeated to obtain a brown powder. This brown powder was soluble in organic solvents such as chloroform, acetone and toluene. The yield was 95% based on the charged monomer.

The structure of the powder was examined by the IR spectrum analysis, the $^{13}$C-NMR spectrum analysis, GPC and the elementary analysis. The obtained results were the same as those of Example 3. From the results of GPC, it was found that the molecular weight was about 6,000 as calculated as polystyrene. From the results of the elementary analysis, it was found that the C/H ratio was 9.8/6.0. From the foregoing measurement results, it was confirmed that the brown powder was polyphenylethynylacetylene of the formula

(where x is about 57).

A film of the polymer was formed on a glass substrate by the solvent casting method (chloroform was used as the solvent) and was exposed to the rays of a 100-W low-pressure mercury lamp for 2 seconds. The exposed portion was completely insolubilized. It was confirmed that a pattern could be formed.

EXAMPLE 6

A blackish brown powder was prepared in the same manner as described in Example 1 except that 1-N-carbazole-1,3-butadiyne monomer was used, molybdenum pentachloride was used instead of tungsten hexachloride and polymerization was conducted at 50° C. for 2 days.

The structure of the obtained powder was examined. In the IR spectrum, peaks attributed to the stretching vibrations of olefinic C—H, C≡C and C=C were observed at the same positions as in Example 2, and in addition, a peak attributed to the stretching vibrations of C—N of the carbazole group was observed at 1340 cm$^{-1}$. In the $^1$H-NMR spectrum, peak attributed to the olefinic hydrogen atom and the aromatic hydrogen atom of the carbazole group were observed at δ=5.2 ppm and δ=7.0 ppm and the integration intensity ratio was 1/10. From the results of GPC, it was found that the number average molecular weight was about 12,000 as calculated as polystyrene. From the results of the elementary analysis, it was found that the C/H/N ratio was 16.3/9.0/1. From the foregoing measurement results, it was found that high-purity poly-N-carbazoleethynylacetylene of the formula (where x is about 115) was obtained.

In the same manner as described in Example 1, a film of the polymer was formed on a glass substrate by using toluene as the solvent and exposed to rays from a 100-W mercury lamp for 3 seconds. The exposed portion was completely insolubilized.

EXAMPLE 7

By using 1-methylvinylethynylacetylene monomer, a blackish brown powder was obtained according to the same polymerization method as described in Example 5.

The structure of the obtained powder was examined. In the IR spectrum, peaks attributed to the stretching vibrations of olefinic C—H, C≡C and C=C were observed at the same positions as in Example 3, and a peak attributed to the C—H stretching vibrations of the CH$_3$ group was observed at 2960 cm$^{-1}$. In the $^1$H-NMR spectrum, peaks attributed to the olefinic hydrogen atom and the hydrogen atom of the methyl group of the propylene group were observed at δ=5.8 ppm and δ=1.8 ppm and the integration intensity ratio of 1/1. From the results of GPC, it was found that the number average molecular weight of the powder was about 4,500 as calculated as polystyrene. From the results of the elementary analysis, it was confirmed that the C/H ratio was 1.05/1.00. From the foregoing measurement results, it was confirmed that high-purity polypropylethynylacetylene of the formula (where x is about 42) was obtained.

In the same manner as described in Example 1, a film of the polymer was formed on a glass substrate and exposed to rays from a 100-W mercury lamp for 1 second. The exposed portion was completely insolubilized.

EXAMPLE 8

By using 1-diphenylcarbinol-1,3-butadiyne monomer, a yellow powder was obtained by the same polymerization method as described in Example 1.

The structure of the powder was examined. In the IR spectrum, peaks attributed to the stretching vibrations of olefinic C—H, C≡C and C═C were observed at the same positions as in Example 2, and peaks attributed to the stretching vibrations of O—H and C—O of the carbinol group were observed at 3300 cm$^{-1}$ and 1015 cm$^{-1}$, respectively. In the $^1$H-NMR spectrum, peaks attributed to the olefinic hydrogen atom, the hydrogen atom of the hydroxyl group of the carbinol group and the hydrogen atom of the benzene ring were observed at δ=5.2 ppm, δ=2.3 ppm and δ=7.2 ppm, respectively, and the integration intensity ratio was 1/1/10. From the results of GPC, it was found that the number average molecular weight was about 7,000 as calculated as polystyrene. From the results of the elementary analysis, it was found that the C/H/O ratio was 17.3/12.2/1.0. From the foregoing measurement results, it was confirmed that high-purity polydiphenylcarbinolethynylacetylene of the formula

(where x is about 67) was obtained.

In the same manner as described in Example 1, a film of the polymer was formed on a glass substrate and exposed to rays from a 100-W low-pressure mercury lamp for 4 seconds. It was found that the exposed portion was completely insolubilized.

EXAMPLE 9

By using 1-benzyl-1,3-butadiyne monomer, a brown powder was obtained by the same polymerization method as adopted in Example 1.

The structure of the powder was examined. In the IR spectrum, peaks attributed to the stretching vibrations of olefinic C—H, C≡C and C═C were observed at the same positions as in Example 2, and strong peaks attributed to the C—H stretching vibrations of the benzyl group were observed at 3020 cm$^{-1}$ aromatic C—H) and 2900 cm$^{-1}$ (—CH$_2$—). In the $^1$H-NMR spectrum, peaks attributed to the olefinic hydrogen atom, the hydrogen atom of the methylene group and the hydrogen atom of the benzene ring were observed at δ=5.2 ppm, δ=3.3 ppm and δ=7.1 ppm, respectively, and the integration intensity ratio was 1/2/5. In the $^{13}$C—NMR spectrum, peaks attributed to the olefinic carbon atom, the acetylenic carbon atom, the methylenic carbon atom and the carbon atom of the benzene ring were observed at δ=120 ppm, δ=83 ppm, δ=40 ppm and δ=128 ppm, respectively, and the integration intensity ratio of 2/2/1/6. From the results of GPC, it was found that the number average molecular weight was about 15,000 as calculated as polystyrene. From the results of the elementary analysis, it was found that the C/H ratio was 11.2/8.0. From the foregoing measurement results, it was confirmed that high-purity polybenzylethynylacetylene of the formula

(where x is about 144) obtained.

In the same manner as described in Example 1, a film of the polymer was formed on a glass substrate and exposed to rays from a 100-W low-pressure mercury lamp for 1 second. It was found that the exposed portion was completely insolubilized.

EXAMPLE 10

A blackish brown powder was obtained by using 1-β-naphthyl-1,3-butadiyne monomer according to the same polymerization method as adopted in Example 1.

The structure of the powder was examined. In the IR spectrum, peaks attributed to the stretching vibrations of olefinic C—H, C≡C and C═C were observed at the same positions as in Example 3, and a strong peak attributed to C—H out-of-plane deformation vibration of the β-naphthyl group was observed at about 800 cm$^{-1}$. In the $^1$H-NMR spectrum, peaks attributed to the olefinic hydrogen atom and the hydrogen atom of the β-naphthyl ring were observed at δ=5.2 ppm and δ=7.4 ppm, respectively, and the integration intensity ratio was 1:7. From the results of GPC, it was found that the number average molecular weight was about 13,000 as calculated as polystyrene. From the results of the elementary analysis, it was found that the C/H ratio was 7.2/4.0. From the foregoing measurement results, it was confirmed that high-purity poly-β-naphthylethynylacetylene of the formula (where x is about 125) was obtained.

In the same manner as described in Example 1, a film of the polymer was formed on a glass substrate and exposed to rays from a 100-W low-pressure mercury lamp for 1 second. It was found that the exposed portion was completely insolubilized.

We claim:
1. A polyethynylacetylene derivative represented by the following general formula:

wherein R is an alkyl group having 1 to 7 carbon atoms, a phenyl group, a benzyl group, a naphthyl group, a carbazole group, a vinyl-alkyl group having 2 to 7 carbon atoms or a group —CX$_1$X$_2$(OH) or —SiX$_1$X$_2$X$_3$ in which X$_1$, X$_2$ and X$_3$ independently represents a hydrogen atom, an alkyl group having 1 to 7 carbon atoms, a phenyl group or a benzyl group, with the proviso that the case where all of X$_1$, X$_2$ and X$_3$ are a hydrogen atom is excluded, and x is a number of from 20 to 500.

2. A polyethynylacetylene derivative as set forth in claim 1, wherein R is Si(C$_n$H$_{2n+1}$)$_3$ in which n is an integer of from 1 to 7.

3. A polyethynylacetylene derivative as set forth in claim 1, wherein R is C$_n$H$_{2n+1}$ in which n is an integer of from 1 to 7.

4. A polyethynylacetylene derivative as set forth in claim 1, wherein R is C$_6$H$_5$.

5. A process for the preparation of a polyethynylacetylene derivative as set forth in claim 1, which comprises polymerizing a monomer represented by the following general formula:

$$HC \equiv C - C \equiv CR$$

wherein R is as defined above, and
polymerization of the monomer is carried out in a liquid phase in the presence of a metathesis catalyst comprising a transition metal compound of the formula WX$_6$, or MoX$_5$, wherein X is a halogen atom, as the main catalyst ingredient.

6. A process for the preparation of a polyethynylacetylene derivative as set forth in claim 1, which comprises polymerizing a monomer represented by the following general formula:

$$HC \equiv C - C \equiv CR$$

wherein R is as defined above, and
polymerization of the monomer is carried out in a liquid phase in the presence of a Ziegler catalyst comprising Ti(OR')$_4$, and AlR''$_3$, wherein R' and R'' independently represent an alkyl group having 1 to 7 carbon atoms.

* * * * *